United States Patent
Perkins (10) Patent No.: US 10,343,507 B2
(45) Date of Patent: Jul. 9, 2019

(54) HYBRID AUTOMOTIVE POWERTRAIN SYSTEM AND METHOD OF OPERATING SAME

(71) Applicant: Ford Global Technologies, LLC, Dearborn, MI (US)

(72) Inventor: William Paul Perkins, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days.

(21) Appl. No.: 15/640,755

(22) Filed: Jul. 3, 2017

(65) Prior Publication Data
US 2018/0022198 A1 Jan. 25, 2018

Related U.S. Application Data

(62) Division of application No. 12/145,990, filed on Jun. 25, 2008, now abandoned.

(51) Int. Cl.
| | |
|---|---|
| *B60K 6/26* | (2007.10) |
| *B60K 6/52* | (2007.10) |
| *B60K 6/48* | (2007.10) |
| *B60K 17/356* | (2006.01) |
| *B60K 1/00* | (2006.01) |
| *B60K 1/04* | (2019.01) |

(52) U.S. Cl.
CPC ............. *B60K 6/26* (2013.01); *B60K 6/48* (2013.01); *B60K 6/52* (2013.01); *B60K 17/356* (2013.01); *B60K 1/00* (2013.01); *B60K 1/04* (2013.01); *Y02T 10/6221* (2013.01); *Y02T 10/6265* (2013.01)

(58) Field of Classification Search
CPC .......... B60K 6/26; B60K 6/52; B60K 17/356; B60K 6/48
USPC ................................................. 180/242, 243
See application file for complete search history.

(56) References Cited

U.S. PATENT DOCUMENTS

| | | | | | |
|---|---|---|---|---|---|
| 5,669,842 | A * | 9/1997 | Schmidt | ................ | B60K 6/365 180/65.25 |
| 5,993,351 | A * | 11/1999 | Deguchi | ................ | B60K 6/442 477/174 |
| 6,427,797 | B1 * | 8/2002 | Chang | ..................... | B60K 1/00 180/233 |
| 6,551,208 | B1 * | 4/2003 | Holmes | .................. | B60K 6/365 180/65.7 |
| 6,845,832 | B2 * | 1/2005 | Takizawa | ............... | B60K 6/365 180/53.8 |
| 6,880,664 | B2 * | 4/2005 | Pecnik | ..................... | B60K 6/26 180/243 |

(Continued)

*Primary Examiner* — Frank B Vanaman
(74) *Attorney, Agent, or Firm* — David B. Kelley; Brooks Kushman P.C.

(57) ABSTRACT

A hybrid powertrain system for a vehicle includes an electric machine, a gear set mechanically connected with the electric machine, and a clutch mechanically coupled with at least one of a primary and secondary driveline assembly. The electric machine is configured to selectively provide motive power to at least one of the primary and secondary driveline assemblies. The gear set is configured to permit differential rotation between the primary and secondary driveline assemblies. The clutch is configured to selectively transfer torque between the primary and secondary driveline assemblies.

5 Claims, 5 Drawing Sheets

(56) References Cited

U.S. PATENT DOCUMENTS

| | | | |
|---|---|---|---|
| 7,140,461 B2 * | 11/2006 | Morrow | B60K 6/365 180/65.245 |
| 7,154,236 B1 * | 12/2006 | Heap | B60K 6/365 318/9 |
| 2005/0115750 A1 * | 6/2005 | Takami | B60K 6/365 180/65.235 |

* cited by examiner

HYBRID AUTOMOTIVE POWERTRAIN SYSTEM AND METHOD OF OPERATING SAME

CROSS-REFERENCE TO RELATED APPLICATION

This application is division of U.S. application Ser. No. 12/145,990, filed Jun. 25, 2008, the disclosure of which is hereby incorporated in its entirety by reference herein.

TECHNICAL FIELD

The invention relates to hybrid automotive powertrain systems and methods of operating the same.

BACKGROUND

Drivetrains for hybrid automotive vehicles may be configured and operated in several ways. As an example, U.S. Pat. No. 5,993,351 to Deguchi et al. discloses a first electrical motor mechanically connected to an engine and a second electrical motor mechanically connected to the engine through a clutch. Motive force is transmitted from the second electrical motor to drive wheels through a transmission. It is decided whether to release the clutch based on a detected vehicle speed and a detected required motive force. Engine output at that time is estimated. The second electrical motor is controlled such that generated torque corresponds to the estimated engine output if it is decided to release the clutch. The first electrical motor is controlled such that the torque generated by the second electrical motor is absorbed.

As another example, U.S. Pat. No. 6,041,877 to Yamada et al. discloses a drive unit for a hybrid vehicle. The drive unit includes an internal combustion engine, a transmission connected to the internal combustion engine via a clutch and a primary differential gear for distributing a driving force transmitted from the transmission to primary driving wheels. The drive unit also includes a transfer connected to the primary differential gear for taking out a part of the driving force transmitted from the transmission to the primary differential gear, a pair of propeller shafts for transmitting part of the driving force from the transfer to a secondary differential gear, and an electric motor provided between the propeller shafts. The drive unit further includes a pair of clutches, each connecting the electric motor to one of the pair of propeller shafts.

As yet another example, U.S. Pat. No. 6,190,282 to Deguchi et al. discloses a first electric motor connected mechanically to an engine and a second electric motor connected mechanically through a clutch to the engine. Drive force is transmitted to drive wheels through a transmission from the second electric motor. It is decided whether to connect the clutch on the basis of driving conditions. The engine is controlled so that the output of the engine meets the required force when it is decided to connect the clutch. The first electric motor functions as an electric generator such that the rotation speed of the engine reaches a target rotation speed. The clutch is connected when the engine is rotating at a target rotation speed.

SUMMARY

A hybrid powertrain system for a vehicle includes a clutch mechanically coupled with at least one of a primary driveline assembly and secondary driveline assembly, an electric machine and a gear set mechanically connected with the electric machine. The clutch is configured to selectively transfer torque between the primary driveline assembly and secondary driveline assembly. The electric machine is configured to selectively provide motive power to at least one of the primary driveline assembly and secondary driveline assembly. The gear set is configured to permit differential rotation between the primary driveline assembly and secondary driveline assembly.

A method for operating a power transfer box of an automotive hybrid powertrain includes providing motive power to at least one of a primary driveline assembly and secondary driveline assembly by converting electrical power to motive power, transferring torque between the secondary driveline assembly and primary driveline assembly via a clutch and transferring torque between the secondary driveline assembly and primary driveline assembly via a gear set.

While example embodiments in accordance with the invention are illustrated and disclosed, such disclosure should not be construed to limit the invention. It is anticipated that various modifications and alternative designs may be made without departing from the scope of the invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
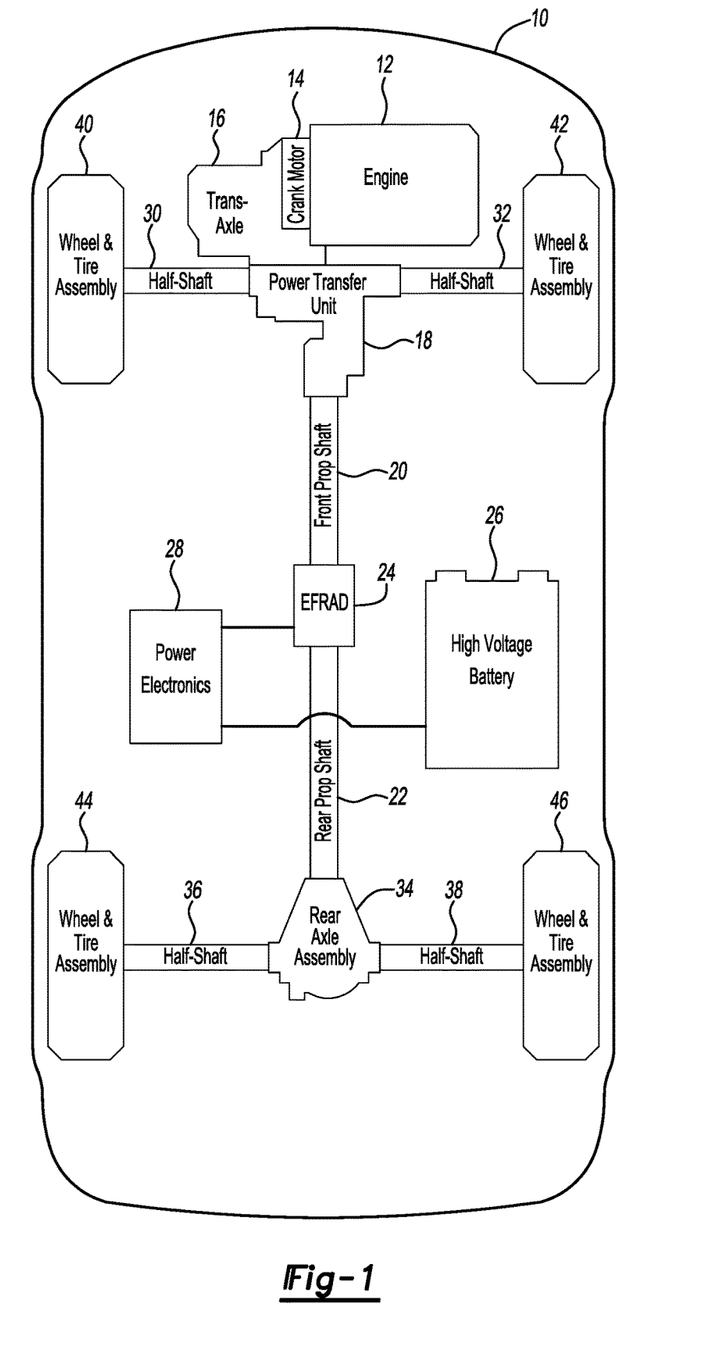
FIG. 1 is a schematic diagram of an embodiment of a powertrain system for an automotive vehicle.

Referring now to FIG. 1, a hybrid electric vehicle 10 may include an engine 12, crank machine 14, transaxle 16 and power transfer unit 18. The vehicle 10 may also include a front prop shaft 20, rear prop shaft 22, electric front/rear auxiliary drive (EFRAD) 24, high voltage battery 26 and power electronics 28. The vehicle 10 may further include left and right front half-shafts 30, 32, rear axle assembly 34, left and right rear half-shafts 36, 38 and wheel and tire assemblies 40, 42, 44, 46. The operation of these elements will be described in greater detail below.

In other embodiments, the vehicle 10 may have a north-south powertrain configuration and/or a fewer or greater number of electric machines. Of course, other vehicle configurations are also possible.

As apparent to those of ordinary skill, elements shown adjacent to one another are mechanically coupled. As an example, the crank machine 14 is mechanically coupled with the engine 12 and transaxle 16 via, for example, suitable gearing. As another example, the rear axle assembly 34 is mechanically coupled with the left and right rear half-shafts 36, 38 and rear prop shaft 22 via, for example, suitable gearing. Torque may thus be transferred between the engine 12 and/or crank machine 14 and the EFRAD 24 via the transaxle 16, power transfer unit 18 and front prop shaft 20. Likewise, torque may be transferred between the rear axle assembly 34 and the EFRAD 24 via the rear prop shaft 22, etc.

Certain embodiments of the EFRAD 24, as explained in detail below, may selectively transfer torque to, from and/or between the front and rear prop shafts 20, 22. Certain embodiments of the EFRAD 24 may also selectively convert between motive power and electrical power.

Figure 2:
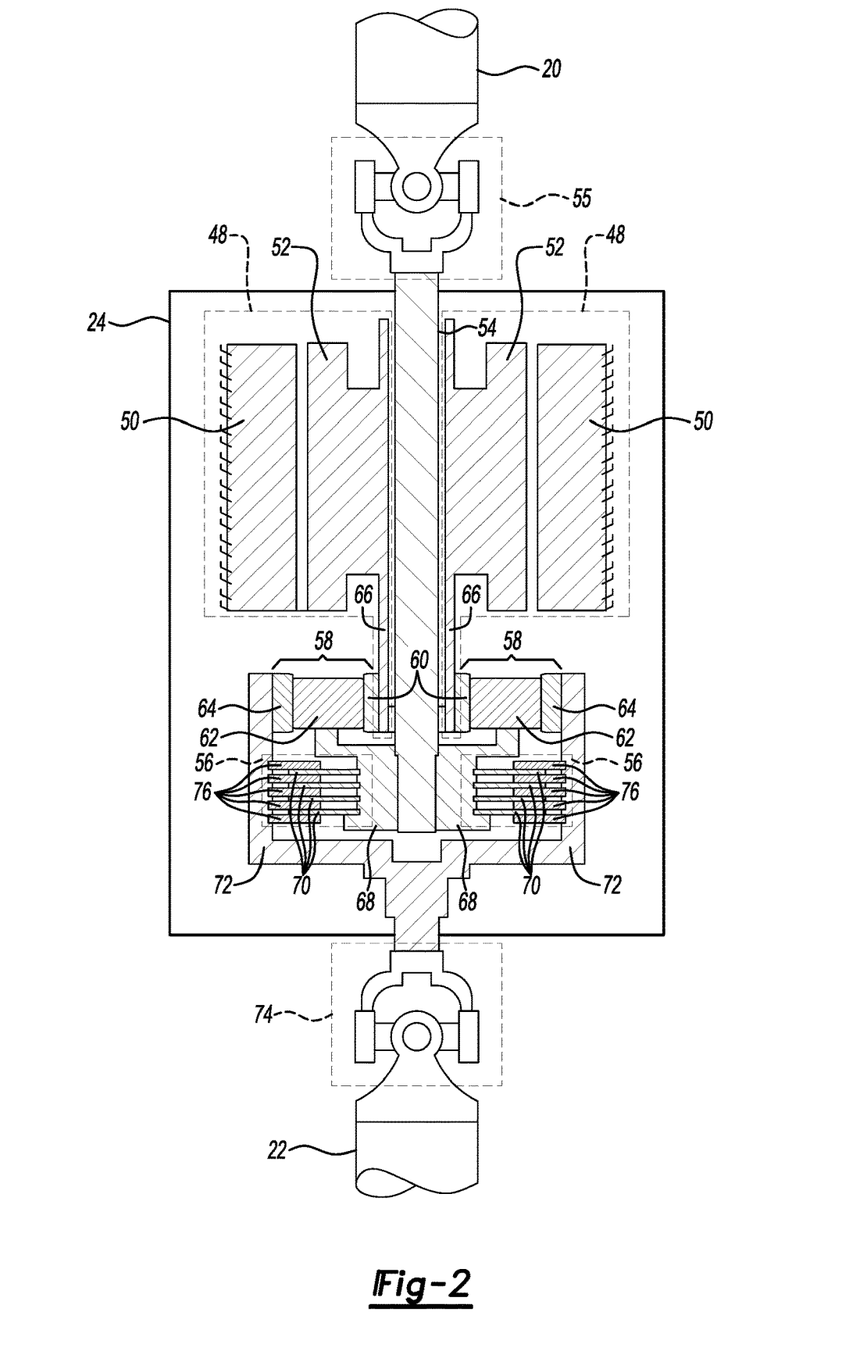
FIG. 2 is a schematic diagram of the electric front/rear auxiliary drive of FIG. 1.

Referring now to FIGS. 1 and 2, an electric machine 48 includes a stator 50 and rotor 52. The electric machine 48 may provide electrical power to, or receive electrical power from, the high voltage battery 26 via the power electronics 28. The stator 50 is fixedly attached, e.g., bolted, with a housing (not shown) of the EFRAD 24. The rotor 52 is rotatably located, e.g. via bearings, within a housing (not shown) and about a linking shaft 54. The linking shaft 54 and the front prop shaft 20 are connected via a joint 55. The rotor 52 thus rotates relative to the front prop shaft 22. As apparent to those of ordinary skill, other arrangements and configurations are also possible.

A planetary gear set 58 includes a sun gear 60, planet gears 62 and ring gear 64. The sun gear 60 is fixedly attached, e.g., press fit, with a leg portion 66 of the rotor 52. The sun gear 60 thus rotates with the front prop shaft 20. In other embodiments, any suitable gear set, e.g., parallel axis, hypoid, spiral bevel, etc., may be used. As apparent to those of ordinary skill, the use of certain gear sets may require, for example, the electric machine 48 to be repositioned within the EFRAD 24, etc.

An inner carrier 68 is fixedly attached, e.g., press fit, with the linking shaft 54. The inner carrier 68 carries the planet gears 62 and inner clutches 70 of the clutch pack 56. The planet gears 62 and inner clutches 70 thus rotate with the front prop shaft 20.

An outer carrier 72 is connected with the rear prop shaft 22 via a joint 74. The outer carrier 72 carries the ring gear 64 and outer clutches 76 of the clutch pack 56. The ring gear 64 and outer clutches 76 thus rotate with the rear prop shaft 22.

In other embodiments, inner clutches and outer clutches may be carried by any suitable component. For example, outer clutches may be carried by a leg portion of a rotor or an outer carrier. Inner clutches may be carried by a leg portion of a rotor. Other configurations are also possible.

In a first mode of operation, the engine 12 produces torque and transmits it to the driveline. The electric machine 48 is disabled, and therefore provides no reaction torque to the planet gears 62 via the sun gear 60. As a result, no torque is transferred from the planet gears 62 to the rear prop shaft 22 via the ring gear 64. The clutch pack 56 is not compressed. As a result, no torque is transferred from the linking shaft 54 to the rear prop shaft 22 via the clutch pack 56. Note that torque from the engine 12 is also being applied to the wheel and tire assemblies 40, 42 through the power transfer unit 18 and front half-shafts 30, 32.

In a second mode of operation, the engine 12 produces torque and transmits it to the driveline. Electrical power is produced by the electric machine 48 and is sent to the power electronics 28 to be stored in the high voltage battery 26 or used for other purposes. The electric machine 48, therefore, applies reaction torque to the planet gears 62 via the sun gear 60. As a result, torque is transferred from the planet gears 62 to the rear prop shaft 22 via the ring gear 64. The clutch pack 56 is not compressed. As a result, no torque is transferred from the linking shaft 54 to the rear prop shaft 22 via the clutch pack 56. The torque from the rear prop shaft 22 is transferred to the left and right rear half-shafts 36, 38 via the rear axle assembly 34 to drive the wheel and tire assemblies 44, 46.

In this mode of operation, the electric machine 48 behaves as a generator. If the mechanical power applied by the electric machine 48 is −x and the mechanical power applied by the front prop shaft 20 is y, the mechanical power transferred to the rear prop shaft 22 is the sum of −x and y (less any system losses.) If the electric machine 48 behaves as a motor, the mechanical power transferred to the rear prop shaft 22 is the sum of x and y (less any system losses.)

In a third mode of operation, no engine torque is being transmitted to the driveline. Electrical power from the power electronics 28 is provided to the electric machine 48. The electric machine 48, therefore, applies torque to the planet gears 62 via the sun gear 60, and consequently to the ring gear 64 via the planet gears 62. As a result, torque is transferred to the front prop shaft 20 via the planet gears 62 and to the rear prop shaft 22 via the ring gear 64. The clutch pack 56 is not compressed. As a result, no torque is transferred between the linking shaft 54 and the rear prop shaft 22 via the clutch pack 56. The torque from the front prop shaft 20 is transferred to the left and right front half-shafts 30, 32 via the power transfer unit 18 to drive the wheel and tire assemblies 40, 42. The torque from the rear prop shaft 22 is transferred to the left and right rear half-shafts 36, 38 via the rear axle assembly 34 to drive the wheel and tire assemblies 44, 46.

In this mode of operation, the electric machine 48 behaves as a motor. The mechanical power from the machine 48 is distributed between the front prop shaft 20 and rear prop shaft 22, and the amount to each is a function of the driveline gear ratios, including that of the planetary gear set 58 (less any system losses.) If the electric machine 48 behaves as a generator, the mechanical power absorbed by the electric machine 48 from the front prop shaft 20 and rear prop shaft 22 is also a function of the driveline gear ratios (less any system losses.)

In a fourth mode of operation, the engine 12 produces torque and transmits it to the driveline. The electric machine 48 is disabled, and therefore provides no torque to the planet gears 62 via the sun gear 60. As a result, no torque is transferred from the planet gears 62 to the rear prop shaft 22. The clutch pack 56 is compressed to variably transfer torque from the linking shaft 54 to the rear prop shaft 22. The torque from the rear prop shaft 22 is transferred to the left and right rear half-shafts 36, 38 via the rear axle assembly 34 to drive the wheel and tire assemblies 44, 46. Note that torque from the engine 12 is also being applied to the front wheel and tire assemblies 40, 42 through the power transfer unit 18 and front half-shafts 30, 32.

In a fifth mode of operation, the engine 12 produces torque and transmits it to the driveline. Electrical power is produced by the electric machine 54 and is sent to the power electronics 28 to be stored in the high voltage battery 26 or used for other purposes. The electric machine 48, therefore, applies reaction torque to the planet gears 62 via the sun gear 60. As a result, torque is transferred from the planet gears 62 to the rear prop shaft 22 via the ring gear 64. The clutch pack 56 is compressed to variably transfer torque from the linking shaft 54 to the rear prop shaft 22. The torque from the rear prop shaft 22 is transferred to the left and right rear half-shafts 36, 38 via the rear axle assembly 34 to drive the wheel and tire assemblies 44, 46. Note that torque from the engine 12 is also being applied to the front wheel and tire assemblies 40, 42 through the power transfer unit 18 and the front half-shafts 30, 32.

In this mode of operation, the electric machine 48 behaves as a generator. The mechanical power transferred to the rear prop shaft 22 is a function of the mechanical power absorbed by the machine 48 and the amount of clutch pack 56 engagement (less any system losses.) If the electric machine 48 behaves as a motor, the mechanical power applied to the rear prop shaft 22 is a function of the mechanical power applied by the machine 48 and the amount of clutch pack 56 engagement (less any system losses.)

In a sixth mode of operation, no engine torque is being transmitted to the driveline. Electrical power from the power electronics 28 is provided to the electric machine 48. The electric machine 48, therefore, applies torque to the planet gears 62 via the sun gear 60, and consequently to the ring gear 64 via the planet gears 62. As a result, torque is transferred to the front prop shaft 20 via the planet gears 62 and to the rear prop shaft 22 via the ring gear 64. The clutch pack 56 is compressed to variably transfer torque between the linking shaft 54 to the rear prop shaft 22, for example, to limit differentiation between the front and rear prop-shafts 20, 22. The torque from the front prop shaft 20 is transferred to the left and right front half-shafts 30, 32 via the power transfer unit 18 to drive the wheel and tire assemblies 40, 42. The torque from the rear prop shaft 22 is transferred to the left and right rear half-shafts 36, 38 via the rear axle assembly 34 to drive the wheel and tire assemblies 44, 46.

In this mode of operation, the electric machine 48 behaves as a motor. The mechanical power from the electric machine 48 is distributed between the front prop shaft 20 and rear prop shaft 22, and the amount to each is a function of the driveline gear ratios, including that of the planetary gear set 58, and the amount of clutch pack 56 engagement (less any system losses.) If the electric machine 48 behaves as a generator, the mechanical power absorbed by the electric machine 48 from the front prop shaft 20 and rear prop shaft 22 is also a function of the driveline gear ratios and the amount of clutch pack 56 engagement (less any system losses).

The clutch pack 56 may provide variable front/rear torque biasing for regenerative braking and propulsion. As an example, the torque biasing relative to the electric machine 48 may be 50% front and 50% rear when the clutch pack 56 is fully compressed and allowing no speed differentiation between front prop shaft 20 and rear prop shaft 22. As another example, the torque biasing relative to the electric machine 48 may be 70% front and 30% rear when the clutch pack 56 is not compressed and the planetary gear set ratio provides a 70/30 front/rear torque split. In some embodiments, variable clutch pack engagement permits variable front/rear torque biasing from 50% front and 50% rear to 70% front and 30% rear. Other biasing schemes, however, are also possible, e.g., 90/10, 40/60, etc.

Figure 3:
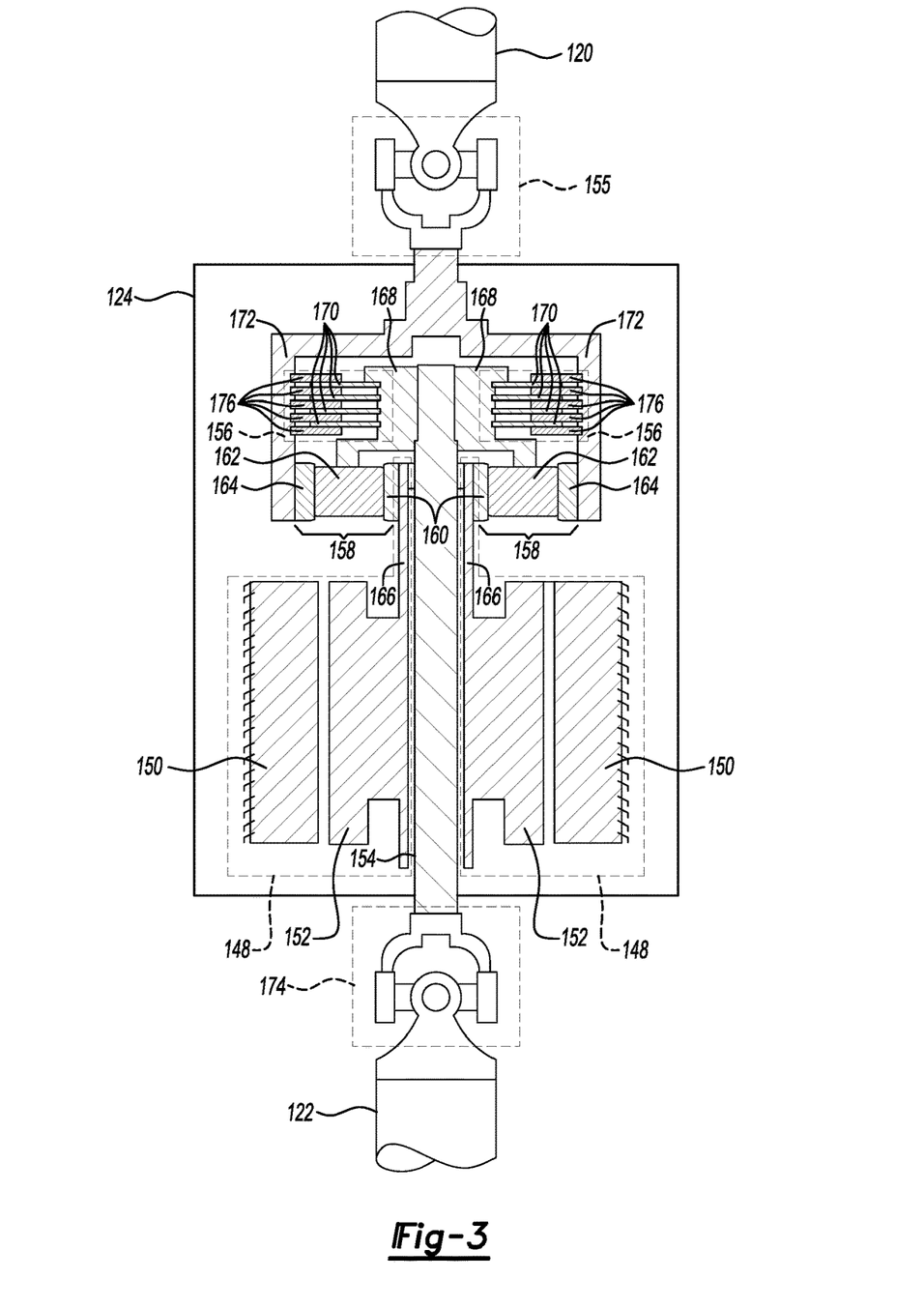
FIG. 3 is a schematic diagram of another embodiment of an electric front/rear auxiliary drive.

Referring to FIG. 3, numbered elements of FIG. 3 that differ by 100 relative to the numbered elements of 2 have similar, although not necessarily identical, descriptions to the numbered elements of FIG. 2. In this embodiment, however, the EFRAD 124 has a configuration that is the reverse of that illustrated in FIG. 2. That is, the linking shaft 154 is connected with the rear prop shaft 122 via the joint 174, and the outer carrier 172 is connected with the front prop shaft 120 via the joint 155. As apparent to those of ordinary skill, the operation of the EFRAD 124 is similar to that of the EFRAD 24 illustrated in FIG. 2 taking into account its reverse configuration. The EFRAD 124, however, provides the opposite front/rear torque split relative to the EFRAD 24 illustrated in FIG. 1. If, for example, the EFRAD 24 illustrated in FIG. 1 provides an arrangement with a 70/30 front/rear torque split, a reverse of that arrangement would provide a 30/70 front/rear torque split, etc.

Figure 4:
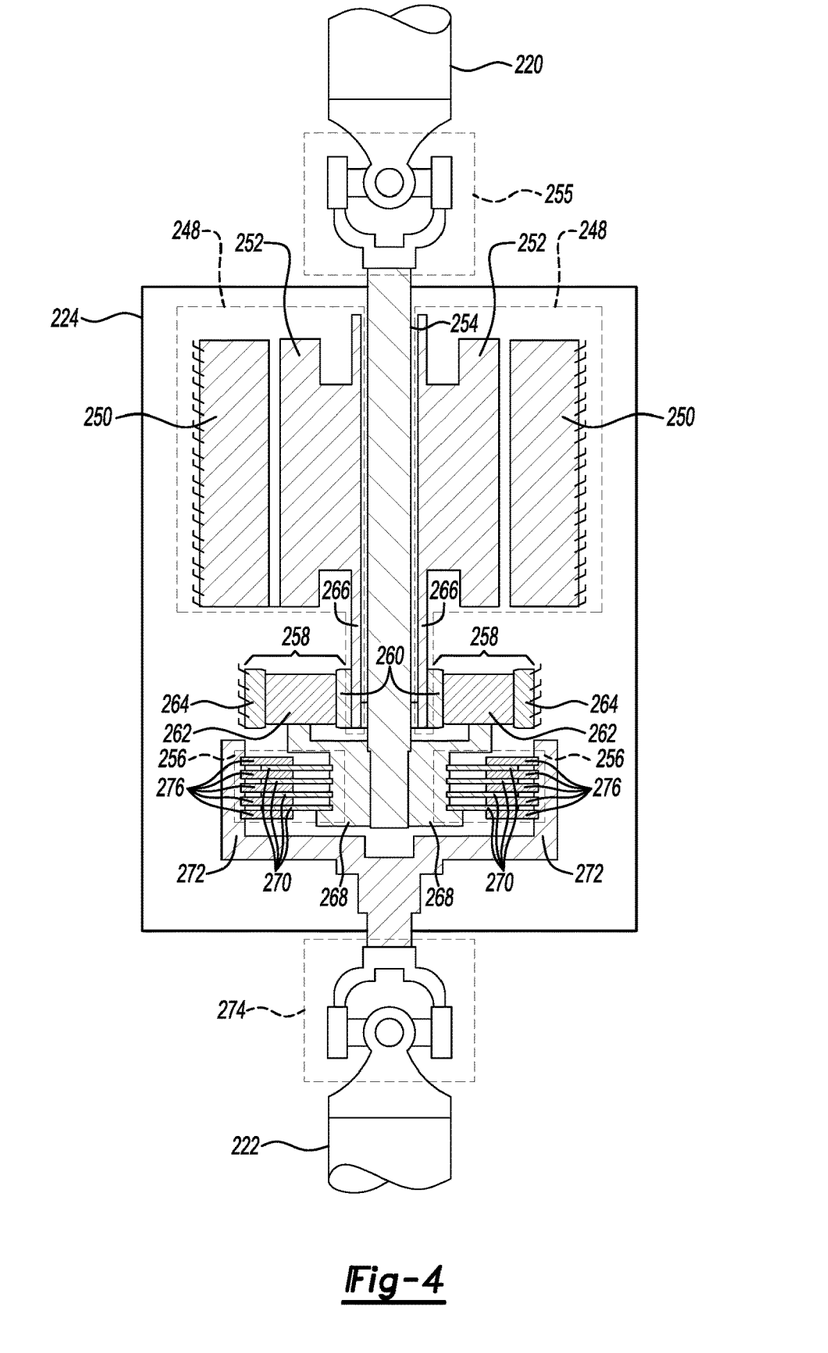
FIG. 4 is a schematic diagram of yet another embodiment of an electric front/rear auxiliary drive.

Referring to FIG. 4, numbered elements of FIG. 4 that differ by 200 relative to the numbered elements of 2 have similar, although not necessarily identical, descriptions to the numbered elements of FIG. 2. In this embodiment, however, the outer carrier 272 does not carry the ring gear 264. Rather, the ring gear 264 is fixedly attached, e.g., bolted, with a housing (not shown) of the EFRAD 224. In other embodiments, any suitable gear set, e.g., parallel axis, hypoid, spiral bevel, etc., may be used. As apparent to those of ordinary skill, the use of certain gear sets may require, for example, the electric machine 248 to be repositioned within the EFRAD 224, etc.

In a first mode of operation, an engine (not shown) produces torque and transmits it to the driveline. The electric machine 248 is disabled, and therefore provides no reaction torque to the planet gears 262 via the sun gear 260. As a result, no torque is transferred to or from the front prop shaft 220 via the planet gears 262. The clutch pack 256 is not compressed. As a result, no torque is transferred from the linking shaft 254 to the rear prop shaft 222 via the clutch pack 256.

In a second mode of operation, the engine (not shown) produces torque and transmits it to the driveline. Electrical power is produced by the electric machine 248 and is sent to power electronics (not shown) to be stored in a high voltage battery (not shown) or used for other purposes. The electric machine 248, therefore, applies reaction torque to the planet gears 262 via the sun gear 260. As a result, torque produced by the engine is converted into electrical power. The clutch pack 56 is not compressed. As a result, no torque is transferred from the linking shaft 254 to the rear prop shaft 222 via the clutch pack 256.

In this mode of operation, the electric machine 248 behaves as a generator. If the electric machine 248 behaves as a motor, torque transmitted to the driveline is the sum of engine torque and electric machine torque (minus other loads and system losses).

In a third mode of operation, no engine torque is being transmitted to the driveline. Electrical power from the power electronics (not shown) is provided to the electric machine 248. The electric machine 48, therefore, applies torque to the planet gears 262 via the sun gear 260. As a result, torque is transferred to the front prop shaft 220 via the planet gears 262. The clutch pack 256 is not compressed. As a result, no torque is transferred between the linking shaft 254 and the rear prop shaft 222 via the clutch pack 256.

In this mode of operation, the electric machine 248 behaves as a motor. If machine 248 behaves as a generator, mechanical power absorbed by the electric machine 248 from the front prop shaft 220 is converted to electrical power.

In a fourth mode of operation, the engine (not shown) produces torque and transmits it to the driveline. The electric machine 248 is disabled, and therefore provides no torque to the planet gears 262 via the sun gear 260. As a result, no torque is transferred to or from the front prop shaft 220 via the planet gears 262. The clutch pack 256 is compressed to variably transfer torque from the linking shaft 254 to the rear prop shaft 222.

In a fifth mode of operation, the engine (not shown) produces torque and transmits it to the driveline. Electrical power is produced by the electric machine 254 and is sent to the power electronics (not shown) to be stored in the high voltage battery (not shown) or used for other purposes. The electric machine 248, therefore, applies reaction torque to the planet gears 262 via the sun gear 260. As a result, torque produced by the engine (not shown) is converted into electrical power. The clutch pack 256 is compressed to variably transfer torque from the linking shaft 254 to the rear prop shaft 222.

In this mode of operation, the electric machine 248 behaves as a generator. If the electric machine 248 behaves as a motor, torque transmitted to the driveline is the sum of engine torque and electric machine torque (minus other loads and system losses).

In a sixth mode of operation, no engine torque is being transmitted to the driveline. Electrical power from the power electronics (not shown) is provided to the electric machine 248. The electric machine 248, therefore, applies torque to the planet gears 262 via the sun gear 260. As a result, torque is transferred to the front prop shaft 220 via the planet gears 262. The clutch pack 256 is compressed to variably transfer torque between the linking shaft 254 and the rear prop shaft 222.

In this mode of operation, the electric machine 248 behaves as a motor. If the electric machine 248 behaves as a generator, mechanical power absorbed by the electric machine 248 from the front prop shaft 220 and rear prop shaft 222 is converted to electrical power.

The clutch pack 256 may provide variable front/rear torque biasing for regenerative braking and propulsion. As an example, the torque biasing may be 50% front and 50% rear when the clutch pack 256 is fully compressed and allowing no speed differentiation between front prop shaft 220 and rear prop shaft 222. As another example, the torque biasing may be 100% front when the clutch pack 256 is not compressed. In some embodiments, variable clutch pack engagement allows for variable front/rear torque biasing from 50% front and 50% rear to 100% front.

Figure 5:
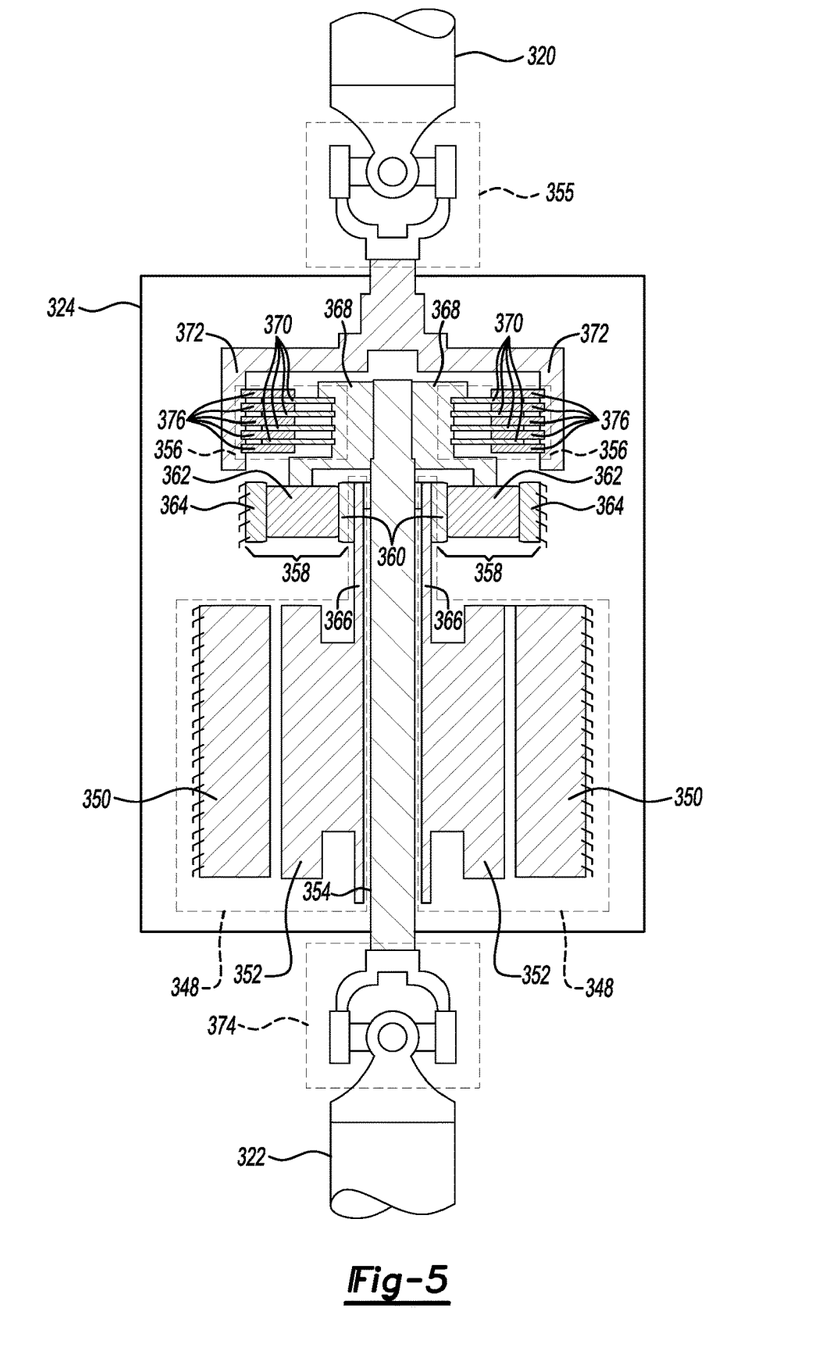
FIG. 5 is a schematic diagram of still yet another embodiment of an electric front/rear auxiliary drive.

Referring now to FIG. 5, numbered elements of FIG. 5 that differ by 100 relative to the numbered elements of 4 have similar, although not necessarily identical, descriptions to the numbered elements of FIG. 5. In this embodiment, however, the EFRAD 324 has a configuration that is the reverse of that illustrated in FIG. 4. That is, the linking shaft 354 is connected with the rear prop shaft 322 via the joint 374, and the outer carrier 372 is connected with the front prop shaft 320 via the joint 355.

As apparent to those of ordinary skill, the operation of the EFRAD 324 is similar to that of the EFRAD 224 illustrated in FIG. 4 taking into account its reverse configuration. The EFRAD 324, however, provides the opposite front/rear torque split relative to the EFRAD 324 illustrated in FIG. 4.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A vehicle hybrid powertrain system comprising:
   front and rear prop shafts configured to drive front and rear wheels respectively; and
   a power transfer box including a housing containing therein
      a linking shaft having a first end drivably connected to one of the front and rear prop shafts,
      a planetary gear set including an outer carrier that has a second end drivably connected to the other of the front and rear prop shafts, a ring gear fixed with the outer carrier, a sun gear rotatable with respect to the linking shaft, planet gears engaged with the ring and sun gears, and an inner carrier fixed with the linking shaft and carrying the planet gears,
      an electric machine including a rotor rotatable with respect to the linking shaft, and
      a clutch pack including inner clutches carried by the inner carrier and outer clutches carried by the outer carrier, the clutch pack configured to transmit torque between the front and rear prop shafts when the electric machine is inactive, and to variably transfer torque between the front and rear prop shafts to limit speed differences between the front and rear wheels.

2. The system of claim 1 wherein the electric machine is configured to selectively convert motive power received from the first or second prop shaft to electrical power.

3. The system of claim 1 wherein the electric machine is configured to selectively free spin.

4. The system of claim 1 further comprising an energy storage unit, wherein the electric machine is configured to provide electrical power to the energy storage unit.

5. The system of claim 1 further comprising an energy storage unit, wherein the electric machine is configured to receive electrical power from the energy storage unit.

* * * * *